United States Patent
Somschor et al.

(10) Patent No.: US 7,350,432 B2
(45) Date of Patent: Apr. 1, 2008

(54) GEARBOX COMPRISING AN ELECTROMECHANICAL ACTUATOR

(75) Inventors: Bernd Somschor, Tettnang (DE); Frank Miehle, Immenstaad (DE); Norbert Sommer, Baienfurt (DE); Jürgen Neuenfeld, Friedrichshafen (DE); Oliver Buchhold, Deggenhausertal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 672 days.

(21) Appl. No.: 10/488,639

(22) PCT Filed: Aug. 29, 2002

(86) PCT No.: PCT/EP02/09626

§ 371 (c)(1),
(2), (4) Date: Mar. 4, 2004

(87) PCT Pub. No.: WO03/023258

PCT Pub. Date: Mar. 20, 2003

(65) Prior Publication Data

US 2004/0254040 A1   Dec. 16, 2004

(30) Foreign Application Priority Data

Sep. 5, 2001 (DE) ................................ 101 43 325

(51) Int. Cl.
*F16H 59/00* (2006.01)
*F16H 61/00* (2006.01)
*F16H 63/00* (2006.01)

(52) U.S. Cl. ........................ 74/335; 74/89.23

(58) Field of Classification Search .................. 74/335, 74/665 L, 89.23
See application file for complete search history.

(56) References Cited

U.S. PATENT DOCUMENTS

| | | | | |
|---|---|---|---|---|
| 3,659,683 A | * | 5/1972 | Betzing ...................... | 188/162 |
| 4,911,031 A | * | 3/1990 | Yoshimura et al. ........... | 74/335 |
| 5,150,629 A | | 9/1992 | Morris et al. ............... | 74/337.5 |
| 5,689,997 A | * | 11/1997 | Schaller ....................... | 74/335 |
| 5,720,206 A | * | 2/1998 | Watanabe et al. ......... | 74/606 A |
| 6,810,762 B2 | * | 11/2004 | Suzuki ....................... | 74/473.3 |

FOREIGN PATENT DOCUMENTS

| | | |
|---|---|---|
| DE | 198 23 050 1 | 12/1998 |
| DE | 199 04 021 A1 | 8/1999 |
| DE | 199 41 474 A1 | 3/2001 |
| EP | 0 373 273 A1 | 6/1990 |
| EP | 0 377 848 B1 | 9/1993 |
| WO | 01/50041 A2 | 7/2001 |

OTHER PUBLICATIONS

Research Disclosure, (May 1992) No. 337, Emsworth, GB, pp. 2.

* cited by examiner

*Primary Examiner*—Tisha Lewis
(74) *Attorney, Agent, or Firm*—Davis Bujold & Daniels, P.L.L.C.

(57) ABSTRACT

A transmission (8) for a motor vehicle (2) with a housing (26) and a shifting apparatus arranged therein and with an electromechanical transmission actuator (24) with a first electric motor (32) for exercising a selection motion of the shifting device with a second electric motor (34) for exercising a shifting motion of the shifting apparatus and with a control unit (22) for receiving sensor signals, for processing the sensor signals and for emitting control signals to the electric motors (32, 34) the axis of rotation of the first electric motor (32) and the axis of rotation of the second electric motor (34) lie parallel to each other.

24 Claims, 8 Drawing Sheets ced completion of PCT/EP02/09626 filed Aug. 29, 2002 which claims priority from German Application Ser. No. 101 43 325.5 filed Sep. 5, 2001.

GEARBOX COMPRISING AN ELECTROMECHANICAL ACTUATOR

This application is a national stage completion of PCT/EP02/09626 filed Aug. 29, 2002 which claims priority from German Application Ser. No. 101 43 325.5 filed Sep. 5, 2001.

FIELD OF THE INVENTION

The invention concerns an electromechanical transmission actuator and a transmission outfitted with an actuator of this type.

BACKGROUND OF THE INVENTION

Motor vehicles with automated gear boxes have been present on the market for a long time. Preferred use areas are motor vehicles in commercial use such as transporters and trucks. Passenger cars with sports applications or small cars have been increasingly outfitted with such transmissions in the recent past. The goal is to free the driver from shifting gears and generally to make a more comfortable and safe operation possible. Motor vehicles with such transmissions usually have two pedals as accelerator and brake. The clutch pedal can be dispensed with. A controller is available in the motor vehicle for selecting the mode of operation. Here an automatic mode, a manual shifting mode and reverse gear can be selected. If the automatic mode is selected, the gear ratio adaptation takes place automatically. Various solutions for automating the gear box exist in the commercial vehicle area. Hence there are different variants, such as, for example, pneumatic, hydraulic or purely electric systems. Which variant is selected basically depends upon the class of motor vehicles and the types of energy available in these vehicles. Furthermore, the power requirement of the actuators used is an important parameter. Pneumatic or hydraulic cylinders or electric motors which drive the selection and shifting apparatus are used as actuators depending upon the system. Actuators, which are driven by electric motors represent especially economical constructions.

There has long been a need with motor vehicle transmissions to continue to use an existing mechanical transmission that is shifted manually with an automatic, electromechanical transmission actuator. Electromechanical transmission actuators for shifting a motor vehicle transmission are known in many ways. Here a transmission is used, which is either developed together with the transmission actuator or has the adaptation elements that must be provided on the transmission for interacting with the transmission actuator.

Such a transmission actuator is known by way of example from European Patent 0 377 848 B1. There an electromechanical transmission actuator is described which has two axes of motion arranged perpendicular to each other. An individual shift finger is guided by two electric motors on the axes of motion. Moreover, the shift finger moved by the first electric motor engages with a first axis of motion into respectively an opening in the various shifter rods arranged parallel alongside one another. The shifter rod is moved by the second electric motor in its long axis by motion of the shift finger on the second axis of motion for shifting a shifting package connected respectively with a shifter rod. The mechanism of motion of the shift finger in two axes of motion arranged perpendicular toward each other indeed corresponds to the selection and shifting specification on the basis of the manual shifting diagram as well as of the selection and the displacement of the respective shifter rod, but it also requires considerable structural space on the other hand. Even the number of components required for the transmission actuator is high.

The invention is based upon the objective of diminishing the number of components and diminishing the structural space required with a transmission actuator.

SUMMARY OF THE INVENTION

An electromechanical transmission actuator of the invention has a first electric motor to exercise a selection motion of a shifting device in a transmission housing of a motor vehicle transmission, and it has a second electric motor to exercise a shifting motion of the shifting device. Sensor signals are received, processes and emitted as control signals to the electric motors in a sensor unit. The control unit can be wholly or partially integrated into the transmission actuator or also be constructed as an external control apparatus. The axis of rotation of the first electric motor and the axis of rotation of the second electric motor lie parallel to each other, which significantly reduces the necessary space required. The use of as many identical parts as possible, such as electric motors, recirculating ball screws or ball nuts for example, enable parallel allocation to one another. In an advantageous refinement, the transmission actuator includes a housing that is mounted on the transmission housing. It is, moreover, precisely mounted in such a way that a manual shifting module is arranged on the transmission housing. In this way, a continued use of a previously manually shifted transmission is also then possible as a shifted transmission automated with a transmission actuator without having to alter the transmission itself, indeed if need be, without having to remove the transmission from the motor vehicle. The flange surface between the transmission actuator and the transmission housing remains unchanged. In another advantageous refinement, the transmission actuator includes a housing that is integrated into the transmission housing. In this way, screwing the transmission actuator outside on the transmission housing and processing tight surfaces of the transmission actuator toward the outside is dispensed with. The housing is preferably made of sheet steel or pressure die cast aluminum. In an especially advantageous design, the first electric motor and the second electric motor are arranged, side by side, on a common side of the housing of the transmission actuator. In a further refinement, the first electric motor and the second motor are arranged on two sides of the housing of the transmission actuator lying opposite to each other. The electric motors are screwed to the housing on their front faces and sealed off from the housing on the flange surface. Each electric motor possesses an external plug contact through which signals are exchanged and voltage supply is assured. When using flattened motors, an especially small transmission actuator can be created by corresponding from the mounting position by twisting of the motor into the mounting position, as is necessary in certain mounting positions. Brushless servomotors, direct current motors, alternating current motors or stepping motors can be used as electric motors. Recirculating ball screws are used in order to use the rotary motion of the electric motors into a linear motion. In one design, one recirculating ball screw with a small incline each is provided for the selection motion and the shifting motion, which is respectively driven directly by an electric motor. In another design, one recirculating ball screw each with a large inclination is provided for the selection motion and the shifting motion, which is respectively driven by one of the electric motors through a gear reduction. Here bevel gears, spur gear, combinations of bevel gear and spur gear transmissions, worm drives or even lever transmissions are used. A thread, a spindle or a threaded spindle and a nut corresponding thereto can also be used as an alternative to the recirculating ball screw and the ball nut movable thereupon.

In one refinement of the invention, a ball nut is provided on the recirculating ball screw for the shifting motion which is arranged in a control cylinder between two spring apparatuses which act in the direction of motion of the recirculating ball screw, and whose motion travels along the recirculating ball screw to the control cylinder in the direction of motion of the recirculating ball screw. When the recirculating ball screw rotates about its axis for the shifting motion, then the ball nut situated upon it moves in an axial direction and at the same time compresses the spring apparatus. The spring apparatus is for reasons of construction space constructed as a package of cup springs. When space permits, other types of springs are also possible, such as spiral springs in pulling or pressing construction, leaf springs, air springs, magnetic springs or plastic springs. These spring packages are used as energy storage mechanisms and are supposed to prevent a possible overstress of transmission shifting or of the drive unit with the electric motor, as well as enable a rapid shifting through the sliding sleeve after reaching the synchronization point. To brace the torque introduced into the recirculating ball screw, a screw or a pin is used, which is axially movable inside the control cylinder, but which prevents a relative rotation of the ball nut in relation the control cylinder. The ball nut, the spring package and the torque bracing are incorporated into the control cylinder. The axial motion of the control cylinder translated in one refinement, for example through a dowel pin or a ball-cylinder pairing, wherewith the control cylinder is connected with a shift lever and a shift finger, into a shifting motion of the shifting device perpendicular to the motion of the control cylinder running along the recirculating ball screw, for example a single selection and shifting shaft. A rotation of the shifting shaft and shift finger toward each other can be prevented by a force or form-locking connection, for example by a clamping pin. If the recirculating ball screw is placed into a rotary motion for the selection motion through the associated electric motor, then the ball nut is axially displaced on the recirculating ball screw. The selection finger is, for example, connected form-locking or force-locking with the ball nut and thus secured against rotation. Moreover, the selecting finger and the ball nut can comprise one component. The selecting finger can be axially secured against displacement relative toward the ball nut through a securing ring. The torque bracing can take place through an axial guiding of the selecting finger in the housing of the transmission actuator. In an advantageous refinement, the power dimensioning of the electric motor is provided with smaller dimensions for exercising the selection motion than the power dimensioning of the electric motor for exercising the shifting motion. The drive output of the electric motor can be variously designed since generally smaller forces must be applied for selecting an alley than, for example, for shifting downward from second into first gear. One design has additional bracing devices, which mount the electric motor on the transmission housing. They reduce the vibration accelerations occurring on the ends of the electric motors. The exact position and shape of the bracing sheet as well as the lashing of the electric motor onto the supporting sheet results from an examination of the excitation frequency of the transmission actuator. A restriction of the maximum acceleration enables a significantly longer and more secure operation of the overall system. In one refinement, a cross coupling is provided between the shaft of the motor and the recirculating ball screw. Through cross couplings or even through another force or form-locking coupling, such as in particular a multiple edge or polygonal profile or a slip coupling, an axle offset between the torque shaft of the electric motor and the recirculating ball screw can be equalized. The axial forces arising in the recirculating ball screw can be intercepted by mounting the recirculating ball screw in the housing of the transmission actuator and are not transmitted to the torque shaft of the electric motor. In another refinement, the recirculating ball screw is the torque shaft of the electric motor. One design has a ventilation apparatus in the transmission actuator, which at the same time guarantees the ventilation of the housing of the transmission actuator and the transmission housing. The arrangement is undertaken in such a way that the ventilation apparatus is not exposed to oil spray or other impairments. Integral or external sensors can be used to establish the current position of the shift finger. In one design, position sensors are provided on the surface of the housing of the transmission actuator, which interact without contact with a magnet on each of the recirculating ball screws. The external sensors likewise possess external plug contacts through which voltage supply and signal exchange is completed. The sensor signals are processed further in the control unit.

When operating automated transmissions, it is important to know exactly the position of the shift forks and engaging the individual gear steps at each point in time. The positions of shift rails of the shifting apparatus can be measured absolutely and thus an engagement of a gear can be recognized. If a position measurement is undertaken through relative sensors, then an adjustment of the sensors relative to the shifting apparatus is necessary after a certain number of shifting processes. In order to prevent the influences of a series scattering in the shifting apparatus and to guarantee functional safety, tolerance restrictions in relation to tolerances allowed with a non-automated transmission are necessary.

The shifting apparatus has reference shifters in an advantageous construction, which establish the defined absolute positions of the selection and operating shafts and which emit signals only when this defined absolute position is reached. The electric motor has an incremental transmitter that forwards the increment for a traversed rotation angle of the electric motor in a direction of rotation to a control unity in which a current measuring device is provided in an H-circuit. The incremental transmitter does not issue any absolute position, but only increments per path traversed and a direction of rotation of the electric motor. An absolute position signal is calculated on the basis of the path increments of the incremental transmitter. This calculation is continually adjusted with known position points. The current measuring device measures the current taken up by the electric motor. A calculated absolute position of the element can be ascertained in the control unit on the basis of the current course measured. This calculated absolute position is adjusted with the defined absolute position upon reaching the reference shifting. A reference shifter is, likewise, provided for adjusting the absolute position for the electric motor for the selection motion. If a signal is received from this reference shifter, then the defined absolute position of the element moved by this electric motor is known. The current absolute position is then compared with this defined absolute position and corrected if need be. In an advantageous construction, the reference shifter for the electric motor for the selection motion in a shifting diagram of the gear shift is arranged in the region between the shifting path of the reverse gear and the first adjacent shifting path for forward gears. If the calculated absolute position is lost, for example in connection with a reset while traveling, then it is possible to infer the resulting direction of travel region of the transmission when sweeping over the reference shifter thus arranged on the basis of the current direction of rotation. In one design, the reference shifters for the electric motor for the shifting motion lie on mechanically determined end positions of the moved elements, especially the selector shaft or shifting rails, which correspond to a completely engaged gear, thus to the position in which shifting is concluded. Without serious restrictions of the shifting facility in a transmission, especially in the case of an automatic transmission, the shifting sequence can be monitored, the engagement of the gears can be recognized and reaching the end position can be established with a sensor.

An especially advantageous design illustrates a transmission with a transmission actuator of the invention, which is an automated gear shift operating according to a shifting logic. Basically the transmission actuator of the invention can also be used for gear shifts in which the shifting signals are generated manually by the motor vehicle operator and are then forwarded to the control unit. Hence the transmission is only shifted when the driver initiates the shifting. The shifting apparatus in the transmission shifted by the transmission actuator preferably includes combined selection or selector shaft upon which the transmission actuator acts by rotation of the combined selection and shifter shaft and acts upon the transmission actuator by axial displacement of the combined selection and shifter shaft as a shifting process.

The shifting apparatus is then constructed as a one rail shift in which the selection and shifter shaft activated by the electric motors engages directly on the shifting elements. The selection and shifter shaft is fixed in the end position of the gears as well as in the neutral position by locking elements.

A multiple rail shift with a selecting and a shifting element can be provided in the form of a central selection and shifter shaft in the case of the shifting apparatus of the gear shift which has at least one electric motor each for the shifting motion and for the selecting motion. This central selection and shifter shaft engages on several rails which respectively activate one shifting element. All rails are fixed in the end positions of the gears as well as in the neutral position by locking elements.

BRIEF DESCRIPTION OF THE DRAWINGS

The invention will now be described, by way of example, with reference to the accompanying drawings in which.

DETAILED DESCRIPTION OF THE INVENTION

Figure 1:
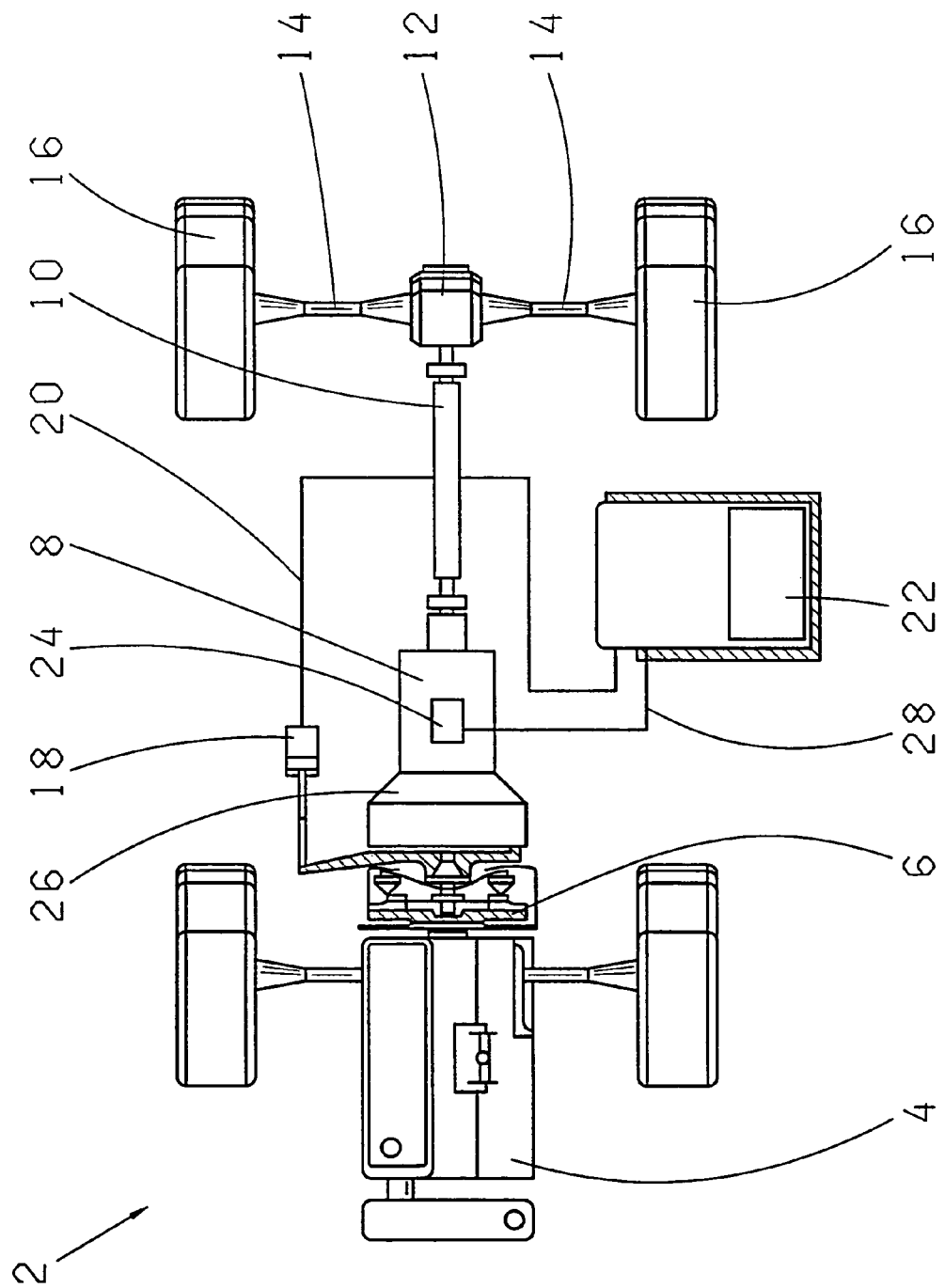
FIG. 1 is a schematic representation of a transmission in the motor vehicle.

FIG. 1 illustrates a schematic representation of a motor vehicle 2 with a drive motor 4 which acts upon a transmission 8 through a friction clutch 6. The transmission 8 is connected with a differential 12 through an output shaft 10, which drives a motor vehicle wheel 16 through one half axle 14 each. The friction clutch 6 is activated by an actuator 18 which is connected with a control unit 22 through a signal line 20. The transmission 8 is activated by a transmission actuator 24 which is arranged on a housing 26 of the transmission and which is connected with the control unit 22 by a line 28.

Figure 2:
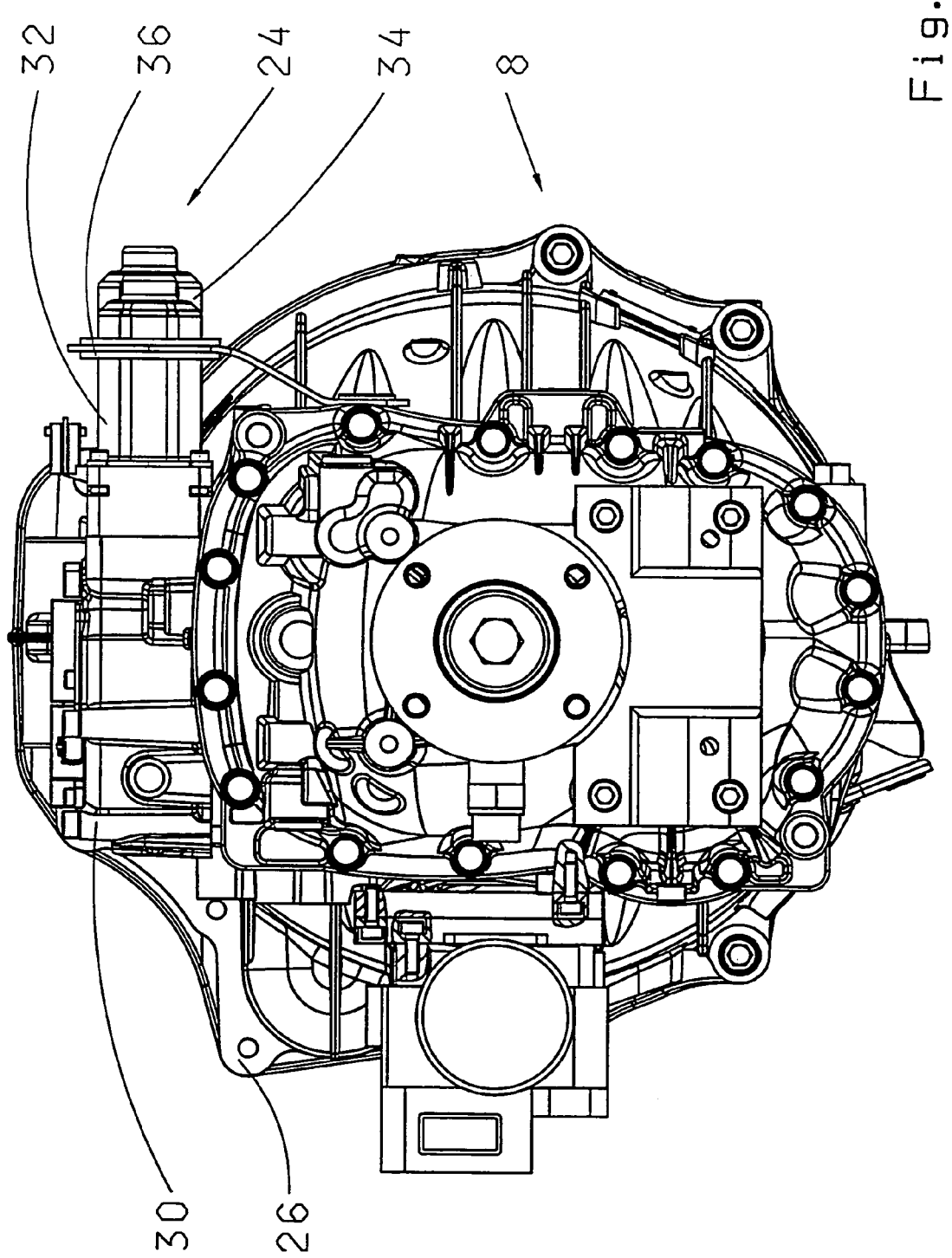
FIG. 2 illustrates the arrangement of a transmission actuator on the transmission.

The transmission actuator 24 in an externally arranged housing 30 is mounted on the transmission housing 26 of the transmission 8 in FIG. 2. A first electric motor 32 and a second electric motor 34 lying beneath it, in this view, are arranged alongside each other on one side of the housing 30. A bracing sheet 36 embraces the two electric motors 32 and 34 and is fastened outside on the transmission housing 26.

Figure 3:
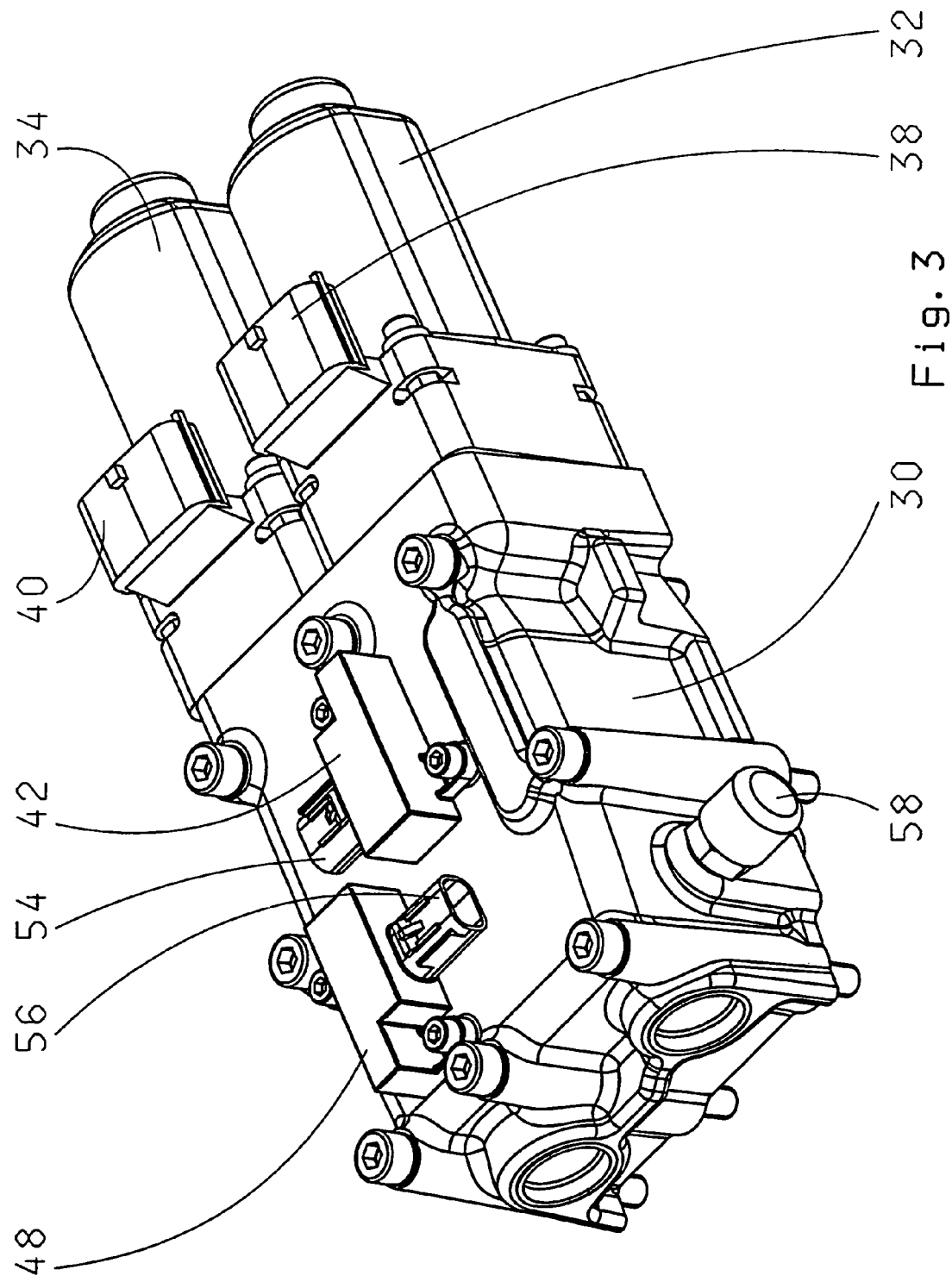
FIG. 3 illustrates a transmission actuator closed.

In FIG. 3, the transmission actuator 24 is represented detached from a transmission. The electric motor 32 and the electric motor 34 are arranged alongside each other on one side on the housing 30. The electric motor 32, competent for executing the selecting motion, has a smaller dimensioning than electric motor 34 which is competent for implementing the shifting motion. Each electric motor 32, 34 has a plug connection 38, 40 which serve for signal transmission and power transmission. An external position sensor 42 registers the displacement of a ball nut 44 of a recirculating ball screw 46 which is competent for the selection motion (see FIG. 4). A further external position sensor 48 registers the displacement of a control cylinder 50 on a recirculating ball screw 52 which is competent for the shifting motion. The position sensors 42, 48 have plug connections 54, 56 which serve to transmit signals. A ventilator 58 is installed on the side of the housing 30 through which the interior of the housing 30 of the transmission actuator 24 as well as the transmission housing 26 is ventilated.

Figure 4:
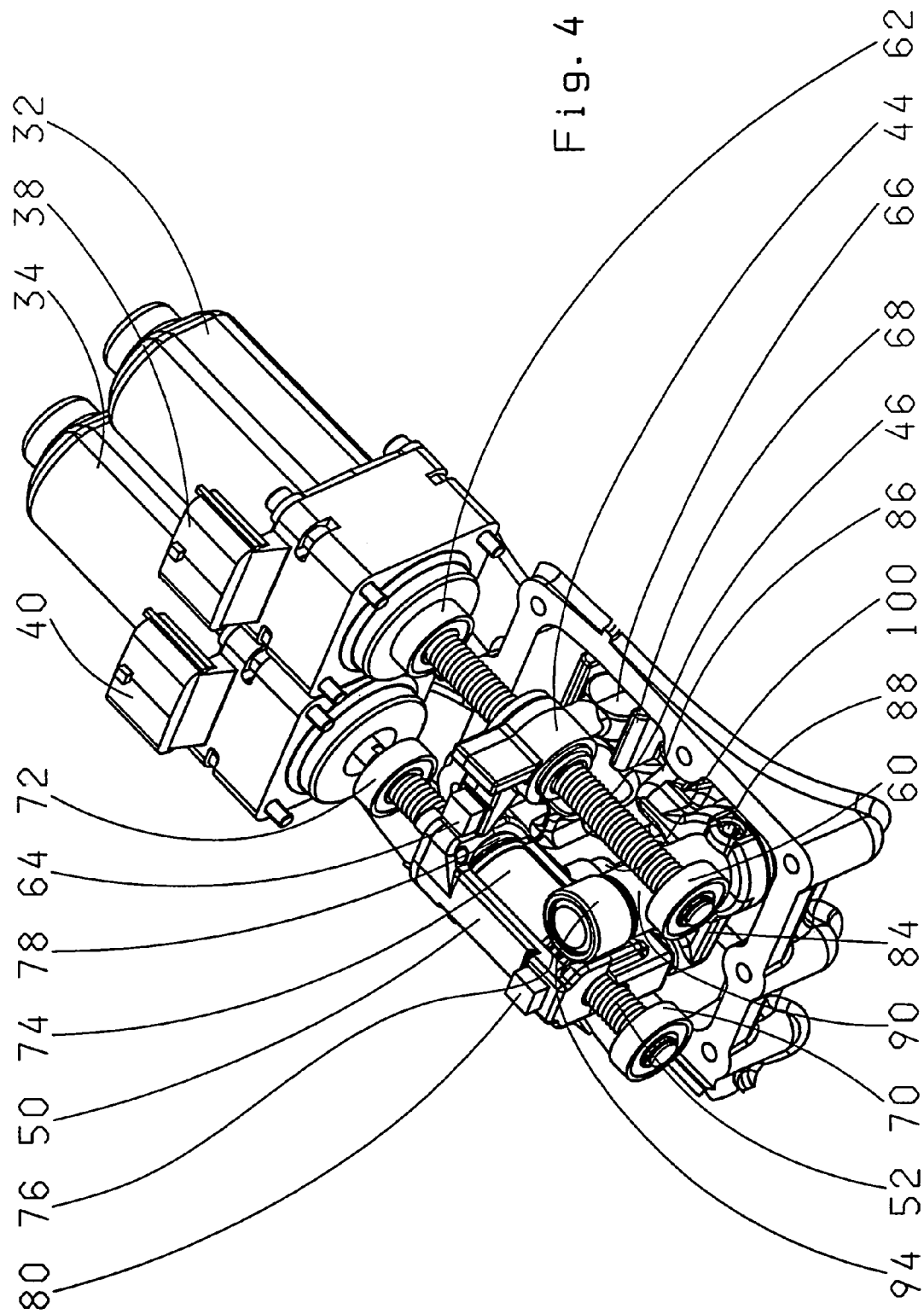
FIG. 4 illustrates a transmission actuator according to FIG. 3 partially opened.

FIG. 4 illustrates the transmission actuator 24, according to FIG. 3, in a partially opened representation that makes possible a detailed description of the functional features of the transmission actuator 24. The electric motor 32 drives the recirculating ball screw 46 that is mounted in two bearings 60 and 62. The ball nut 44 is axially displaced on the recirculating ball screw 46 when the electric motor 32 is rotated, whereby the current position of the ball nut 44 is transmitted over a magnet 64 mounted on an extension arm of the ball nut 44 to the position sensor 42. A shift finger 66 is provided on the ball nut 44 which is constructed circular on its depicted lower end. The shift finger 66 engages into a selection and shifter shaft 68 of the transmission 8 with this circular part which extends at right angles toward the axis of rotation of the recirculating ball screw 46. The shift finger 66 rotates the selection and shifter shaft 68 about its axis of rotation through an axial motion of the ball nut 44 along the recirculating ball screw 46 and in this way executes a selection motion in the shifting apparatus. The larger electric motor 34 drives the recirculating ball screw 52 which is mounted in two bearings 70 and 72. A ball nut 74 is axially displaced on the recirculating ball screw 52 when the electric motor 34 rotates. Moreover, the ball nut 74 first compresses either the cup springs in a spring package 76 or in a spring package 78 depending upon the direction of rotation which are both provided each on one side of the ball nut 74 inside the control cylinder 50. The current position of the control cylinder 50 is transmitted to the position sensor 48 through a magnet 80 mounted on the control cylinder 50. The control cylinder 50 is connected with one end of a deflection lever 84 through a dowel pin 82 (FIG. 6) which transmits the motion of the control cylinder 50. The shift finger 66 engages on the selection and shifter shaft 68 with its end. The axial motion of the ball nut 74 is deflected by the deflection lever 84 in such a way that the selection and shifter shaft 68 arranged perpendicular to the recirculating ball screw 52 is displaced along its axis of rotation and in this way conducts a shifting motion in the shifting apparatus. The deflection lever 84 is secured by a clamping pin 88 onto torque shaft 90 against a relative rotation on the torque shaft 90. The torque shaft 90 is mounted in a bearing 92 (FIG. 6) in the transmission housing 26 and in a bearing 94 in the housing 30 of the transmission actuator 24. In this way, the planned mounting of the manual shifting apparatus in the transmission housing 26 can be undertaken.

Figure 5:
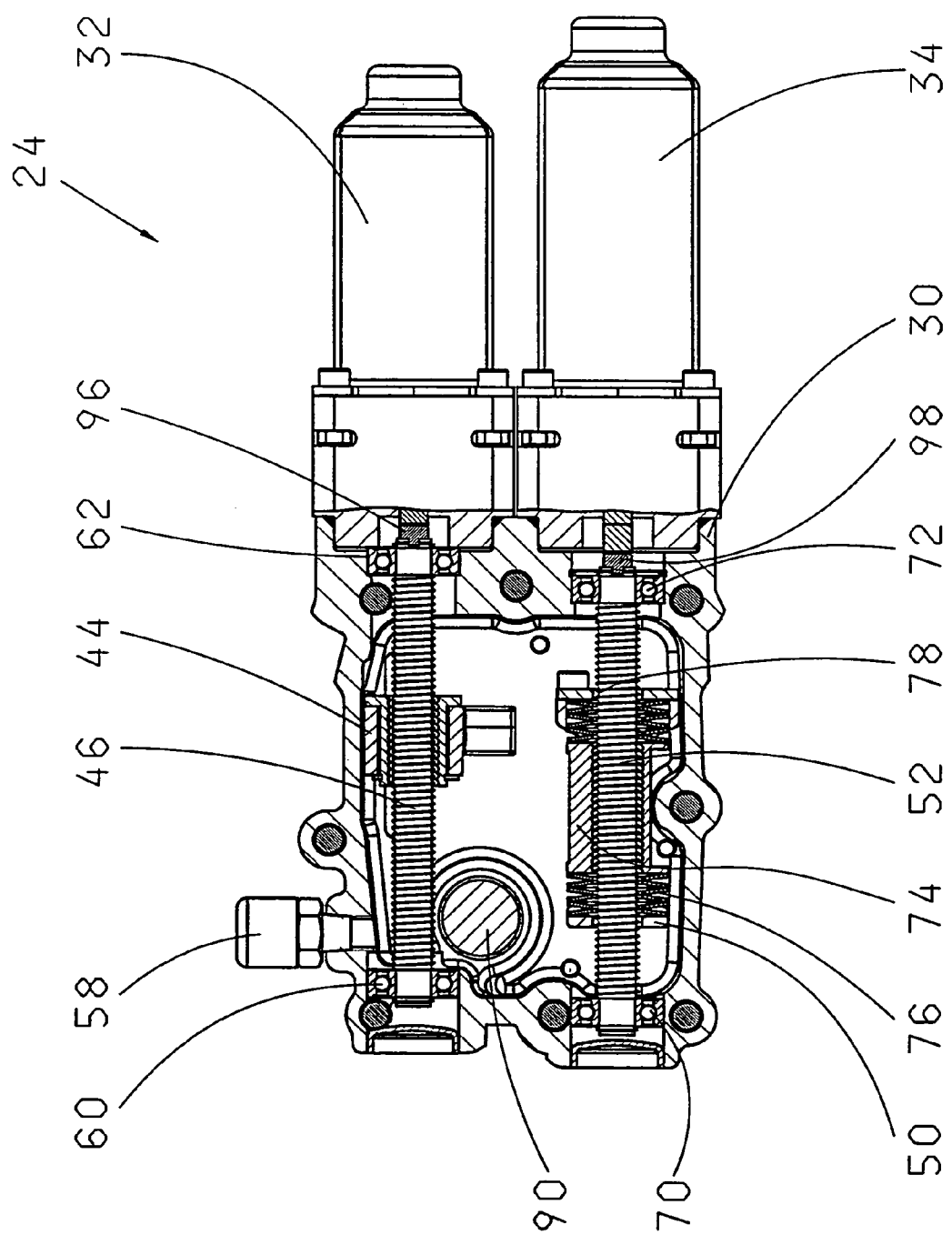
FIG. 5 illustrates the transmission actuator in plan view in partial section.

FIG. 5 illustrates the transmission actuator 24 in a partial section views in which the transmission actuator 24 is viewed 24 from below. The electric motors 32 and 34 of different sizes are represented closed in a plan view while the sectioned region of the recirculating ball screws 46 and 52 depicts the spring packages 76 and 78 opened on both sides of the ball nut 74 on the ball spindle 52. The cup springs in the spring packages 76 and 78 first absorb the motion of the ball nut 74 and, if the situation in the shifting permits, the motion is transmitted to the shifting apparatus through the control cylinder 50. The rotary motion of the electric motors 32 and 34 are transmitted to the recirculating ball screws 46 and 52 from the axes of rotation through cross couplings 96 and 98. In this way, the torque between the components is transmitted despite a possible axle offset between the torque shaft of the electric motor and the recirculating ball screw. The ventilator 58 is arranged in the housing 30 of the transmission actuator 24.

Figure 6:
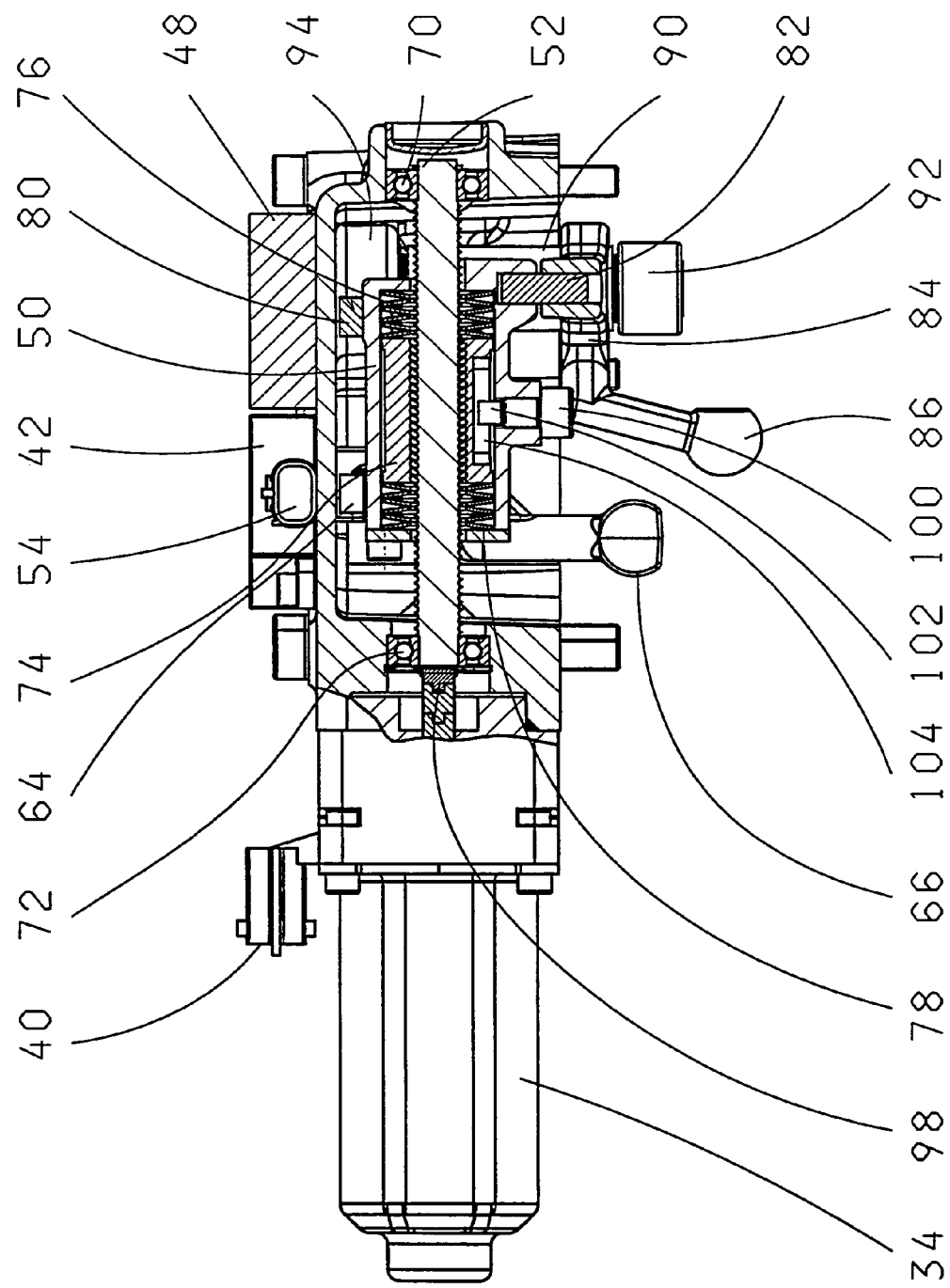
FIG. 6 illustrates the transmission actuator in elevation in partial section.

FIG. 6 depicts the transmission actuator 24 in a partial section side view in which a section through the recirculating ball screw 52 is shown which is competent for the shifting motion. Identical components, as in other parts of the drawings, have the same reference numbers. When the recirculating ball screw 52 is rotated by the electric motor 34, the ball nut 74 is moved from right to left on the drawing plane. Moreover, the spring packages 76 or 78 are first compressed and the control cylinder 50 is moved through this. The ball nut 74 is secured against a rotation relative to the control cylinder 50 during its axial motion by a screw 100 or a dowel pin which is fastened in the control cylinder 50 and whose tip 102 engages into an axial slot 104 inside the ball nut 74. The slot allows an axial motion of the ball nut 74 but impedes its rotation. The mounting of the torque shaft 90 in bearings 92 and 94 can be clearly recognized in FIG. 6. The connection between the control cylinder 50 and the deflection lever 84, which is guaranteed by the dowel pin 82, likewise, is recognizable. The shift finger 66 projects downward out of the transmission actuator 24 to enter into connection with the not depicted selection and shifter shaft 68. A shift finger 86 on the deflection lever 84 projects even further downward out of the transmission actuator and engages laterally on the selection and shifter shaft 68. The magnet 64 on the ball nut 44 interacts with the position sensor 42 for position recognition, while the magnet 80 on control cylinder 50 interacts with the position sensor 48.

Figure 7:
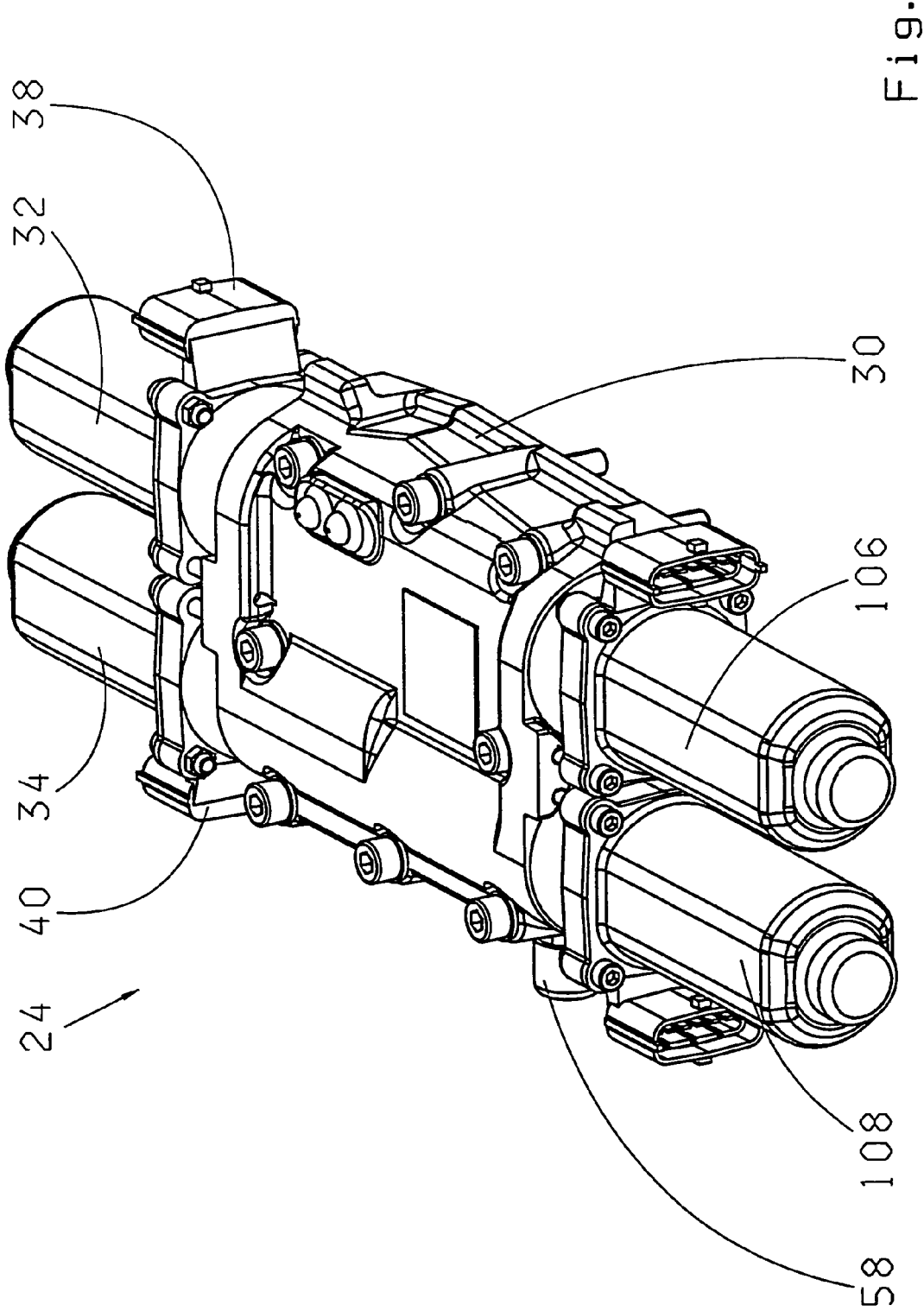
FIG. 7 illustrates a transmission actuator with four motors.

FIG. 7 illustrates an arrangement of the transmission actuator 24 in which two additional electric motors 106 and 108 are installed on the housing 30 in addition to motors 32 and 34. The housing 30 is basically constructed such that either two electric motors lying alongside each other are provided on it as in FIG. 3 or four electric motors are provided as in FIG. 7. Of the four electric motors 32, 34, 106, 108, two electric motors 32 and 106 or 34 and 108, respectively, engage on the same recirculating ball screw 46 or 52. The electric motors can be configured smaller with identical activation force, or the activation forces for the shifting elements can be increased when using identical electric motors through the engagement of the respective two electric motors. Plug connections 110 and 112 are provided on the electric motors 106 and 108 just as on the electric motors 32 and 34 for transmitting signals and current supply.

Figure 8:
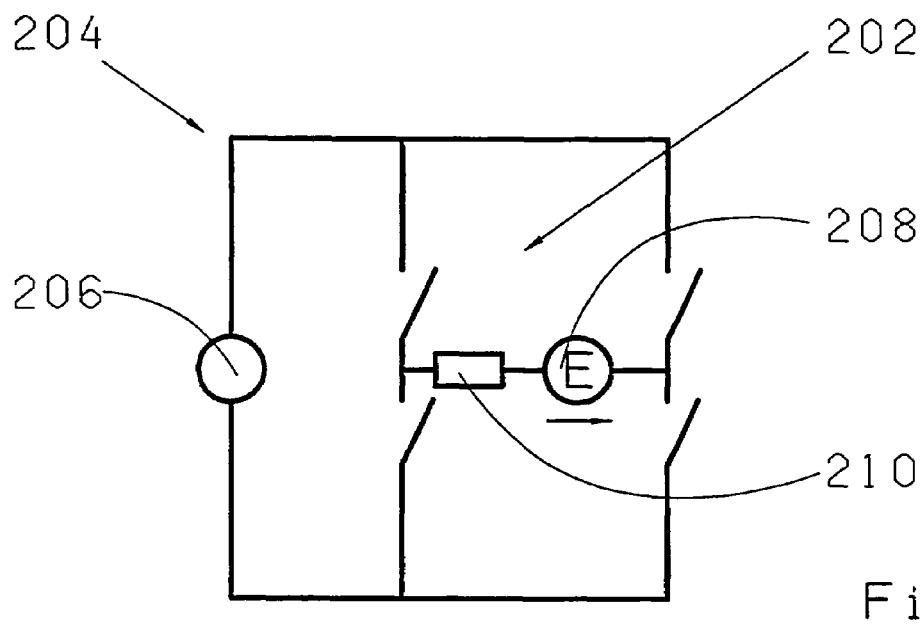
FIG. 8 illustrates an H shift in the control unit.

FIG. 8 illustrates an H-bridge 202 in a control unit 204, a voltage source 206, an electric motor 208 and a current measuring device 210. The current measuring device 210 makes an indirect measurement of the torque of the electric motor 208 possible.

Figure 9:
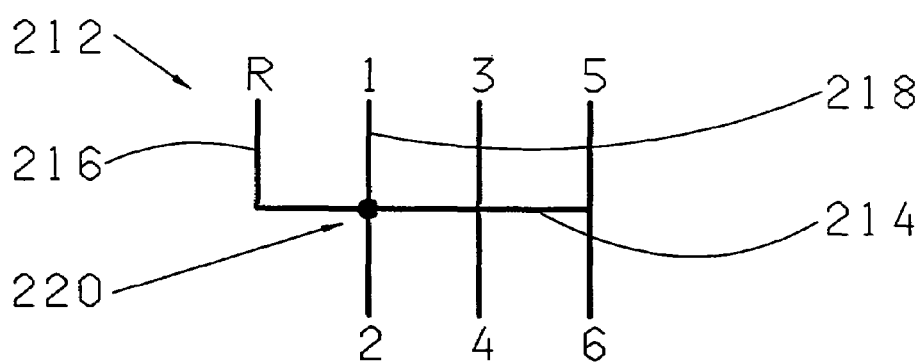
FIG. 9 illustrates a shifting diagram.

FIG. 9 illustrates a shifting diagram 212 for a six-gear gear shift. A position 220 for a reference shifter is provided in a selection path 214 between a shifting path 216 for the reverse gear and a shifting path 218 for the first and second reverse gear which can be swept over in the event of loss of the calculated absolute position.

Figure 10:
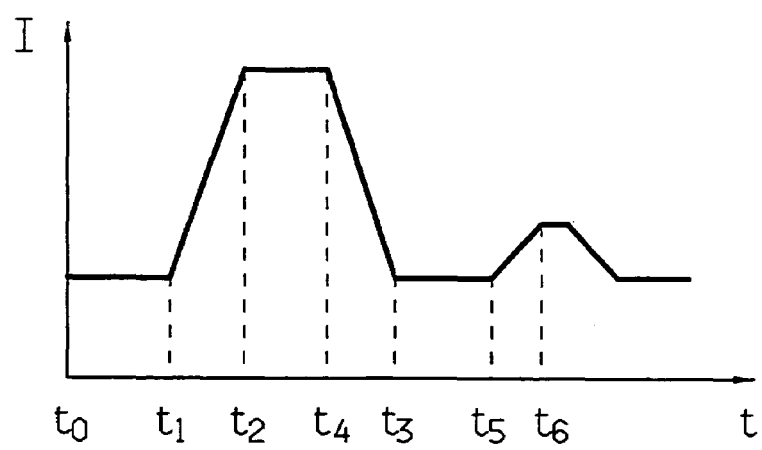
FIG. 10 illustrates a current course during a shifting.

FIG. 10 illustrates a typical curve of the current I over time t measured in the current measuring device as it is basically measured when shifting into any desired gear. The current lies on a constant level in a first phase from t_0 to t_1. In the synchronizing phase from t_1 to t_2, the current rises when the clutch sleeve strikes upon associated elements of the gear wheel to be shifted in the shifting apparatus until the synchronized running of the components is attained. The current drops again in the phase from t_3 to t_4 upon unblocking the synchronization while the clutch sleeve is moved in the direction of the position of reaching the gear to be shifted. If this end position of the shifting rails or shifter shaft fixed by locking elements is reached, the current I in the electric motor rises again in the phase from t_5 to t_6. If the motor 208 shuts off, for example by reaching a reference shifter, then the shifting rails or shifter shaft remains in the end position fixed by locking elements. If the shifting element 50 provided with a shifting elasticity 76, 78 is used in a transmission actuator 24 of the shifting apparatus (FIG. 4), then the clamped shifting elasticity 76, 78 is released and at the same time pushes the non self-inhibiting recirculating ball screw 52 back. The electric motor 208, 34, 108 is therewith situated in a defined absolute position and this absolute position can be compared with the calculated absolute position. The calculated absolute position can then be equalized, if need be. This equalization is conducted for each gear in each shift.

| Reference numbers | |
|---|---|
| 2 | Motor vehicle |
| 4 | Drive motor |
| 6 | Friction clutch |
| 8 | Transmission |
| 10 | Output shaft |
| 12 | Differential |
| 14 | Half axle |
| 16 | Motor vehicle wheel |
| 18 | Actuator |
| 20 | Signal line |
| 22 | Control unit |
| 24 | Transmission actuator |
| 26 | Housing |

-continued

| Reference numbers | |
|---|---|
| 28 | Line |
| 30 | Housing |
| 32 | Electric motor |
| 34 | Electric motor |
| 36 | Bracing sheet |
| 38 | Plug connection |
| 40 | Plug connection |
| 42 | Position sensor |
| 44 | Ball nut |
| 46 | Recirculating ball screw |
| 48 | Position sensor |
| 50 | Control cylinder |
| 52 | Recirculating ball screw |
| 54 | Plug connection |
| 56 | Plug connection |
| 58 | Ventilator |
| 60 | Bearing |
| 62 | Bearing |
| 64 | Magnet |
| 66 | Shift finger |
| 68 | Selection and shifting shaft |
| 70 | Bearing |
| 72 | Bearing |
| 74 | Ball nut |
| 76 | Spring package |
| 78 | Spring package |
| 80 | Magnet |
| 82 | Dowel pin |
| 84 | Deflection lever |
| 86 | Shift finger |
| 88 | Clamping pin |
| 90 | Torque shaft |
| 92 | Bearing |
| 94 | Bearing |
| 96 | Cross coupling |
| 98 | Cross coupling |
| 100 | Screw |
| 102 | Tip |
| 104 | Slot |
| 106 | Electric motor |
| 108 | Electric motor |
| 110 | Plug connection |
| 112 | Plug connection |
| 202 | H bridge |
| 204 | Control unit |
| 206 | Voltage source |
| 208 | Electric motor |
| 210 | Current measuring device |
| 212 | Shifting diagram |
| 214 | Selection path |
| 216 | Shifting path |
| 218 | Shifting path |
| 220 | Position |

The invention claimed is:

1. An electromechanical transmission actuator (24) which includes a first drive device for implementing a selection motion of a shifting apparatus in a transmission housing (26) of a transmission (8) of a motor vehicle (2) with a first electric motor (32, 106), a second drive device for exercising a shifting motion of the shifting apparatus with a second electric motor (34, 108) and a control unit (22, 204) for receiving sensor signals for processing the sensor signals and for issuing control signals to the first and second electric motors (32, 34, 106, 108, 208), and wherein a nut (74) is arranged directly between two spring apparatus (76, 78) inside a control cylinder (50) provided on a spindle (52) for imparting a shifting motion to the shifting apparatus according to a direction of motion of the spindle (52).

2. The electromechanical transmission actuator (24) according to claim 1, wherein the control cylinder (50) is connected with a deflection lever (84) and a shift finger (86) which translates a motion of the control cylinder (50) along the spindle (52) into a shifting motion of the shifting apparatus running perpendicular to this.

3. The electromechanical transmission actuator (24) according to claim 1, wherein a spring apparatus includes a spring package (76, 78) of cup springs.

4. The electromechanical transmission actuator (24) according to claim 1, wherein the spindle (46, 52) is provided with an incline for the selection motion and the shifting motion which is respectively driven by at least one of the first and second electric motors (32, 34, 106, 108).

5. The electromechanical transmission actuator (24) according to claim 1, wherein the spindle (46, 52) is provided for the selection motion and the shifting motion which is respectively driven through a gear ratio of at least one of the first and second electric motors (32, 34, 106, 108).

6. The electromechanical transmission actuator (24) according to claim 1, wherein a force-locking or a form-locking coupling (98) is provided between a shaft of at least one of the first and second electric motors (32, 34, 106, 108) and the spindle (46, 52).

7. The electromechanical transmission actuator (24) according to claim 6, wherein a cross coupling (98) is provided between the shaft of at least one of the first and second electric motors (32, 34, 106, 108) and the spindle (46, 52).

8. The electromechanical transmission actuator (24) according to claim 1, wherein the spindle (46, 52) is a torque shaft of the first and second electric motor (32, 34, 106, 108).

9. The electromechanical transmission actuator (24) according to claim 1, wherein the spindle is a recirculating ball screw (46, 52).

10. The electromechanical transmission actuator (24) according to claim 1, wherein the first drive device and the second drive device are arranged alongside each other on a common side of a housing (30) of the transmission actuator (24).

11. The electromechanical transmission actuator (24) according to claim 1, wherein the first drive device and the second drive device are arranged on two opposite sides of a housing (30) of the transmission actuator (24).

12. The electromechanical transmission actuator (24) according to claim 11, wherein the first drive device has two electric motors (32, 106) and the second drive device has two electric motors (34, 108).

13. The electromechanical transmission actuator (24) according to claim 1, wherein the power dimensioning of the first electric motor (32, 106) for exercising the selection motion is provided smaller than the power dimensioning of the second electric motor (34, 108) for exercising the shifting motion.

14. The electromechanical transmission actuator (24) according to claim 1, wherein the transmission actuator (24) includes a housing (30) which can be mounted upon the transmission housing (26).

15. The electromechanical transmission actuator (24) according to claim 1, wherein the transmission actuator includes a housing that is incorporated into the transmission housing.

16. The electromechanical transmission actuator (24) according to claim 1, wherein a ventilation apparatus (58) is provided in the transmission actuator (24) which simultaneously guarantees ventilation of a housing (30) of the transmission actuator (24) of the housing (26) of the transmission (8).

17. The electromechanical transmission actuator (24) according to claim 1, wherein first and second position sensors (42, 48) are provided on a surface of the housing (30), each of the first and second position sensors (42, 48) interact with a magnet (64, 80) on each of the spindles (46, 52).

18. The electromechanical transmission actuator (24) according to claim 1, wherein the shifting apparatus has a plurality of reference shifters which establish defined absolute positions of a plurality of movable elements (68), wherein the first and second electric motors (208, 32, 34, 106, 108) has an incremental transmitter which forwards the increments for a traversed rotation angle of the first and second electric motor (208, 32, 34, 106, 108) in a direction of rotation to the control unit (22, 204) in which a current measuring device (210) is provided in an H bridge (202) which measures a current taken up by the first and second electric motor (208, 32, 34, 106, 108), and a calculated absolute position of the plurality of movable elements (68) can be ascertained in the current curve measured on the basis of calculated absolute position which is adjustable upon reaching the reference shifter with the defined absolute position.

19. The electromechanical transmission actuator (24) according to claim 18, wherein the reference shifter for the first electric motor (208, 32, 106) for the selection motion in a shifting diagram (212) of the transmission (8) is arranged in the region of a selection path (214) between a shifting path (216) for a reverse gear and a first adjacent shifting path (218) for forward gears.

20. The electromechanical transmission actuator (24) according to claim 18, wherein the plurality of reference shifters for the first and second electric motor (208, 34, 108) lie on mechanically fixed end positions of the plurality of movable elements (68) which correspond to a completely engaged gear.

21. A transmission (8) for a motor vehicle (2) with a housing (26) and a shifting apparatus arranged therein and with an electromechanical transmission actuator (24) which includes a first drive device for implementing a selection motion of a shifting apparatus in a transmission housing (26) of a transmission (8) of a motor vehicle (2) with a first electric motor (32, 106), a second drive device for exercising a shifting motion of the shifting apparatus with a second electric motor (34, 108) and a control unit (22, 204) for receiving sensor signals for processing the sensor signals and for issuing control signals to the first and second electric motors (32, 34, 106, 108, 208), and wherein a nut (74) is arranged directly between two spring apparatuses (76, 78) inside a control cylinder (50) provided on a spindle (52) for imparting a shifting motion to the shifting apparatus according to a direction of motion of the spindle (52).

22. The transmission (8) according to claim 21, wherein the transmission (8) is an automated transmission operating according to a shifting logic.

23. The transmission (8) according to claim 21, wherein a combined selection and shifter shaft (68) is provided in the shifting apparatus on which the transmission actuator (24) acts by rotating the combined selection and shifting shaft (68) as selection process and upon which the transmission actuator (24) acts by axial displacement of the combined selection and shifting shaft (68) as a shifting process.

24. An electromechanical transmission actuator (24) comprising:

a first drive device comprising a first electric motor (32, 106) for imparting a selection motion to a gear shifting apparatus in a transmission housing (26) of a transmission (8) of a motor vehicle (2);

a second drive device comprising a second electric motor (34, 108) for imparting a shifting motion to the gear shifting apparatus of the transmission (8);

a control unit (22, 204) for receiving and processing sensor signals and for issuing control signals to the first and second electric motors (32, 34, 106,108, 208); and wherein the second electric motor (34, 108) drives a ball screw spindle (52) supporting a nut (74) and a control cylinder (50), and two separate spring apparatus are interposed directly between opposing sides of the nut (74) and the control cylinder (50) and rotation of the ball screw spindle (52) causes the nut to directly compress one of the two separate spring apparatus and motivates the control cylinder (50) to transmit the shifting motion to the gear shifting apparatus according to a direction of motion of the ball screw spindle (52).

* * * * *